United States Patent [19]

Canney

[11] Patent Number: 5,522,224
[45] Date of Patent: Jun. 4, 1996

[54] MODEL PREDICTIVE CONTROL METHOD FOR AN AIR-SEPARATION SYSTEM

[75] Inventor: William M. Canney, Sugarland, Tex.

[73] Assignee: Praxair Technology, Inc., Danbury, Conn.

[21] Appl. No.: 290,123

[22] Filed: Aug. 15, 1994

[51] Int. Cl.⁶ .................................................... F25J 3/00
[52] U.S. Cl. ............................... 62/656; 62/924; 364/501
[58] Field of Search .................................... 62/21, 22, 37, 62/18; 364/501

[56] References Cited

U.S. PATENT DOCUMENTS

| | | | |
|---|---|---|---|
| 4,349,869 | 9/1982 | Prett et al. | 364/159 |
| 4,734,114 | 3/1988 | Tasaka et al. | 62/37 |
| 4,784,677 | 11/1988 | Al-Chalabi | 62/37 |
| 4,801,209 | 1/1989 | Wadlow | 356/417 |
| 5,084,081 | 1/1992 | Rohde | 62/22 |
| 5,100,447 | 3/1992 | Krishnamurthy et al. | 62/22 |
| 5,313,800 | 5/1994 | Howard et al. | 62/22 |

OTHER PUBLICATIONS

"Multivariable Constraint Control Of An Air Separation Unit", S. S. Treiber, J. C. Walker, D. V. Black and G. C. Laurier; Niall O'Connell and Justin Dornaneau, submitted to *Chemical Engineering*, 1994.

*Primary Examiner*—Ronald C. Capossela
*Attorney, Agent, or Firm*—Cornelius F. O'Brien

[57] ABSTRACT

A cryogenic air separation process generates both an intermediate product and an output product. The intermediate product is produced earlier in time than the output product and variations in output product measurements correlate to earlier variations in intermediate product measurements. The process responds to plural independent variable phenomena. The apparatus includes analyzers for providing measures of the intermediate and output products and the independent variable phenomena. A control processor predicts a measure of the intermediate product, based on the independent variable phenomena and output predicted values therefor. A difference is then determined between the current predicted value for the intermediate product and a measure of the intermediate product, to arrive at a prediction error. The processor is responsive to this intermediate product prediction error to further predict both current and future values of the output product so as to enable control actions to be taken with respect to the output product to control impurities therein.

17 Claims, 7 Drawing Sheets

MODEL PREDICTIVE CONTROL METHOD FOR AN AIR-SEPARATION SYSTEM

FIELD OF THE INVENTION

This invention relates to an improved control method for an air separation system and, more particularly, to an improved method for predicting a future dynamic response of an air separation process measurement to provide improved product impurity control.

BACKGROUND OF THE INVENTION

Argon is a component of air that is present at slightly less than a 1% mole fraction. In FIG. 1, a cryogenic air separation system is illustrated for producing gaseous oxygen, gaseous nitrogen and liquid oxygen. Argon is also a product of the cryogenic air separation process and regulation of product argon impurities is critical to optimization of argon production and operations safety of the process. In the system of FIG. 1, air is first compressed to approximately 5–6 atmospheres in a compressor 10, purified and fed to a high pressure column 12 where the air feed undergoes a preliminary separation into liquid fractions of crude oxygen and substantially pure nitrogen. A portion of nitrogen outflow passes via a pipe 14 to a high pressure product gaseous nitrogen output 16. The remainder of nitrogen outflow is condensed in a condensor/reboiler, is subcooled in a heater exchanger 20, and is then provided as liquid reflux to the top of a low pressure column 24. The liquid oxygen fraction from high pressure column 12, comprising oxygen, argon and nitrogen, is fed via pipe 18 through a heat exchanger 20, a condenser 22 and into a side feed in a low pressure column 24. An inflow of externally supplied liquid nitrogen is also fed to low pressure column 24 via pipe 25. Due to the relative volatilities of nitrogen, argon and oxygen, argon accumulates in an intermediate stripping section of low pressure column 24 where it is withdrawn to form a feed fraction for a side arm argon column 26. Gaseous nitrogen is recovered from the top of low pressure column 24 and gaseous and liquid oxygen are recovered from the bottom thereof.

A stream of argon vapor is withdrawn from the top of argon column 26 and is condensed in a condenser 22. A fraction of the argon stream is withdrawn from condenser 22 and is discharged as a product argon stream at output 28. Further details of the operation of the system shown in FIG. 1 can be found in U.S. Pat. No. 5,313,800 to Howard et al., assigned to the same Assignee as this application. The disclosure of the Howard et al. patent is incorporated herein by reference.

Regulation of product argon impurity is critical to optimization of argon production and is accomplished by action of process control computer 30 which receives as inputs, multiple measured values from various connected analyzers (A) and issues process control and regulation commands to control instrumentalities (not shown).

Process measurements from low pressure column 24, when properly evaluated, provide information about a subsequent dynamic response of product argon impurity at outflow 28. Certain measurements at low pressure column 24 are partially redundant to measurements of the product argon stream 28 in that they provide similar information about what changes are occurring in the process, although at different times. As these measurements are partially redundant and because generally no manipulatable variable or combination of variables exists for producing independent changes in these measurements, such measured properties cannot be independently controlled.

A prior art method for dealing with product argon nitrogen impurity control and involves a cascade control procedure is shown in FIG. 2 where product argon nitrogen content is cascaded to the control of argon column feed argon content. Nitrogen content is controlled by manipulation of an argon content set point. Argon content, by contrast, is controlled by manipulation of low pressure column gaseous oxygen product flow. This arrangement enables a slower responding product argon nitrogen content controller to provide a calculated set point to a faster responding feed argon content controller.

In specific, the measured product argon nitrogen content is compared against minimum and maximum targets (decision box 40) and if between those targets, the argon nitrogen content set point is set equal to the current measured argon nitrogen measured content (box 42). If the argon nitrogen content is not within the targets, the argon nitrogen set point is set equal to the nearest target limit value (box 43). The procedure then moves to a control calculation (box 44), based upon the selected argon nitrogen set point and the current value, as measured. The output of this control calculation is an argon column feed argon set point that will drive the argon nitrogen content to its set point.

The calculated feed argon content set point is then fed to a feed argon content control calculation procedure (box 46) which also has, as an input, the measured argon column feed argon content. The control calculation output is an oxygen flow change value to enable an alteration of the nitrogen content in the argon stream. A further compensation occurs in response to a measured column air flow change (box 48). The oxygen flow change and any compensation required as a result of a column airflow change are summed in summer 49. The output is a calculated output flow set point change to an oxygen flow controller.

As shown in FIG. 2, the control procedure comprises a first loop including boxes 40, 42, 43 and 44 which, together, provide a feed argon content set point, and a second loop which, based upon the argon content set point, calculates an oxygen flow set point for product argon nitrogen content control. The cascade control shown in FIG. 2 depends upon the second loop achieving the target calculated by the first loop well within the process response time of the first loop. If the first loop makes adjustments before the response of the second loop is completed, the cascaded controllers fight each other and degrade the performance of the system.

As indicated above, a control action that is responsive to argon column feed argon content is preferred as that variable responds to process upsets significantly sooner than product argon nitrogen content. However, as the two quantities, i.e., product argon nitrogen content and argon column feed argon content, are essentially dependent variables, independent control thereof is not possible.

Accordingly, it is an object of this invention to provide an improved control procedure which enables a more rapid response of a system being controlled to process upsets and set point limit changes.

It is another object of this invention to employ measured changes in an intermediate product of a process to predict changes in an output product measurement.

It is still another object of this invention to provide an improved air separation control process wherein argon stream nitrogen content is more precisely controlled as a result of prediction estimates derived from measurements of argon column feed argon content or product oxygen impurities.

SUMMARY OF THE INVENTION

A cryogenic air separation process generates both an intermediate product and an output product. The intermediate product is produced earlier in time than the output product and variations in output product measurements correlate to earlier variations in intermediate product measurements. The process responds to plural independent variable phenomena. The apparatus includes analyzers for providing measures of the intermediate and output products and the independent variable phenomena. A control processor predicts a measure of the intermediate product, based on the independent variable phenomena and output predicted values therefor. A difference is then determined between the current predicted value for the intermediate product and a measure of the intermediate product, to arrive at a prediction error. The processor is responsive to this intermediate product prediction error to further predict both current and future values of the output product so as to enable control actions to be taken with respect to the output product to control impurities therein.

DETAILED DESCRIPTION OF THE INVENTION

The invention will be described in the context of the air separation process shown schematically in FIG. 1. However, it is to be understood that the invention is applicable to other processes and other applications within the cryogenic air separation process. It is to be further understood that the invention is concerned with achieving inputs to process control instrumentalities that are assumed as present in the process apparatus, as shown in the prior art.

Figure 1:
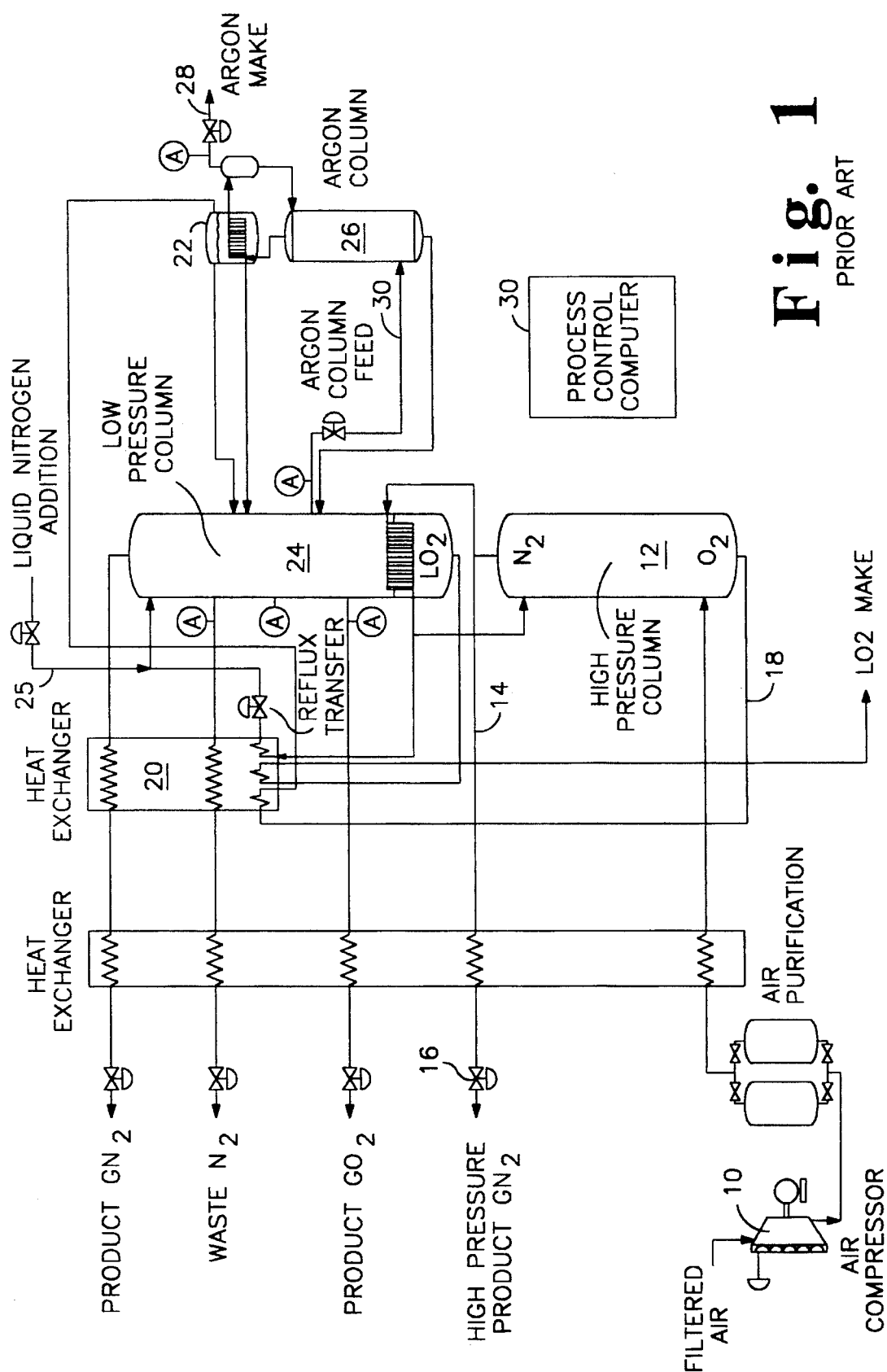
FIG. 1 is a schematic of a cryogenic air separation process.
Figure 2:
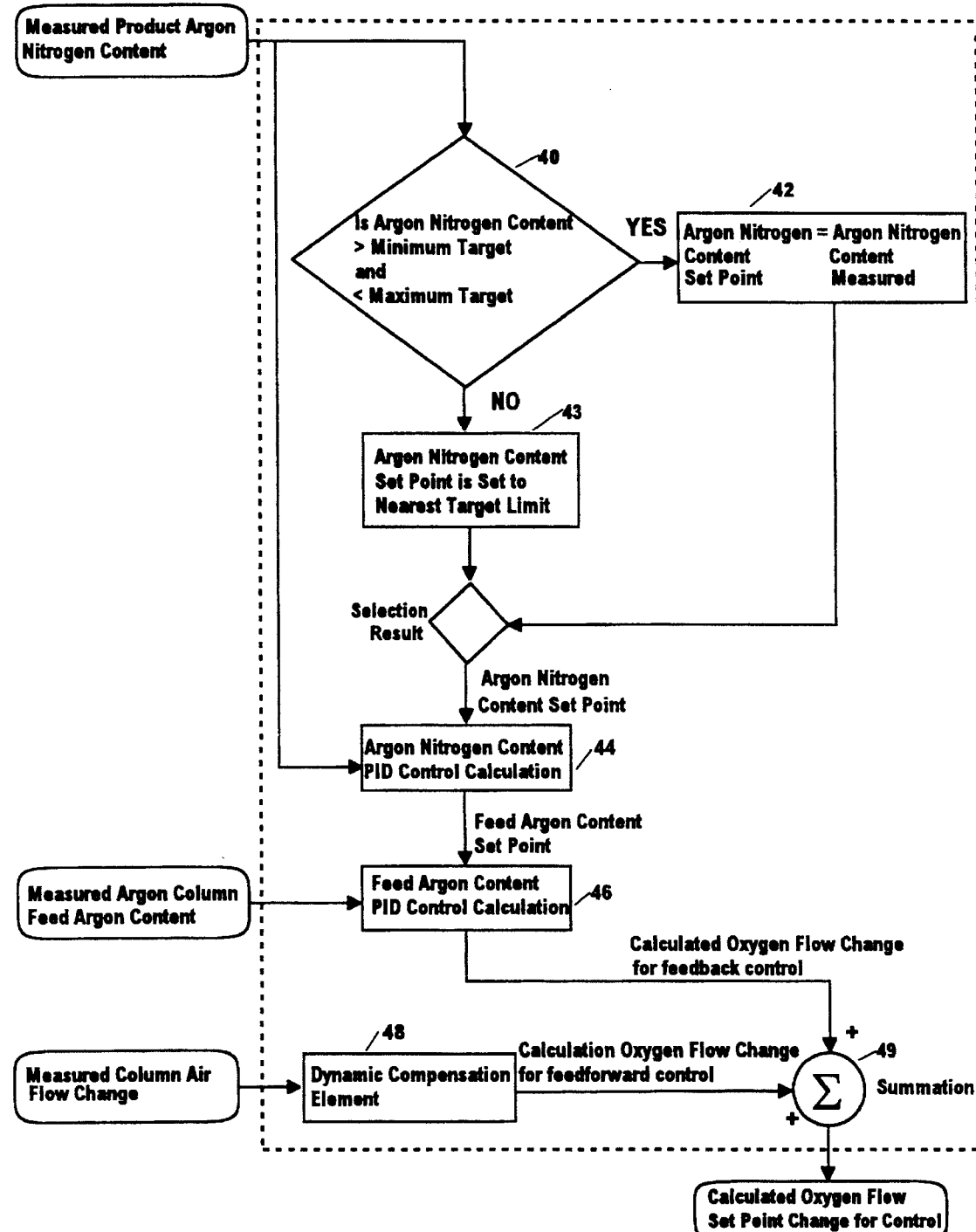
FIG. 2 is a flow diagram illustrating a prior art control method as applied to the system of FIG. 1.
Figure 3:
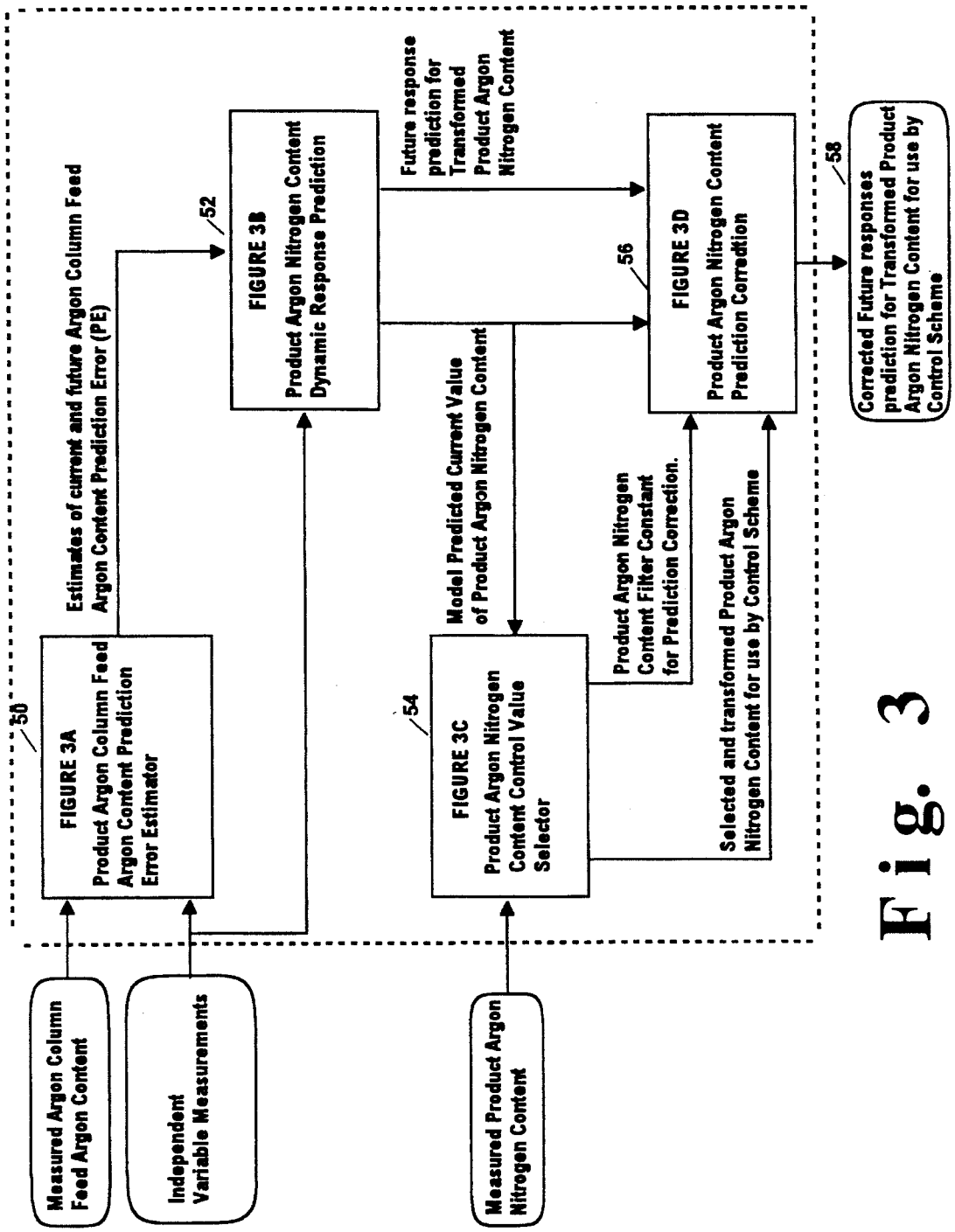
FIG. 3 is a high level flow diagram illustrating the overall procedure of the invention, as applied to the cryogenic air separation system of FIG. 1.

FIG. 3 is a high level flow diagram which illustrates the method of the invention in arriving at future response predictions for product argon nitrogen content from argon outflow 28 (see FIG. 1). This future response prediction exhibits improved accuracy, as compared to the prior art. The future response prediction is then be used to determine process regulation actions which are enhanced and more optimal due to more accurate determinations of transient deviations from set point. Methods for subsequent calculation of process regulation actions are known to those skilled in the art and well not be further described.

The product argon nitrogen content prediction method uses as its main inputs: measured argon column feed argon content (from feed line 30 between low pressure column 24 and argon column 26), other independent variable measurements that affect argon column feed argon content or product argon nitrogen content; and measured product argon nitrogen content. Those inputs are employed to enable process control computer 30 to perform a prediction error estimation process for the product argon column feed argon content (box 50). Details of the procedure followed in box 50 are described with respect to FIG. 3A below.

The output from the prediction error estimator (box 50) includes estimates of both current and future argon column feed argon content prediction errors. Those prediction errors evidence the difference between previously determined estimates of current and future argon content in the argon column feed as compared with the measured argon column feed argon content. Prediction errors are generated and passed to a product argon nitrogen content dynamic response prediction model (box 52). That model calculates product argon nitrogen content (from argon column 26) based both upon independent variable measurements upon which the nitrogen content is dependent, and upon the current and estimated future prediction errors of the argon column feed argon content (as determined in box 50). The prediction error input enables an anticipation of argon nitrogen content variations at a point in time earlier than such a variation could be detected from the other independent variable measurements.

Outputs from the procedure of box 52 are a model predicted current value of product argon nitrogen content and a set of values providing a prediction of the future product argon nitrogen content transient response. The predicted product argon nitrogen content is transformed to engineering units for comparison with engineering unit input set points. The model-predicted current value of product argon nitrogen content is fed to box 54, as is measured product argon nitrogen content. There, it is determined whether the measured product argon nitrogen content is within acceptable measurement limits. If yes, the measured product argon nitrogen content is selected for subsequent process control calculations. If no, the model-predicted current value of product argon nitrogen content is employed. This selection action avoids use of an inaccurate measured product argon nitrogen content which might result in system under or overcorrection. Thus, as shown in box 54, the product argon nitrogen content control value selector determines which nitrogen content value to employ.

The selected nitrogen value is then subjected to a non-linear scaling transformation for use in the control scheme. The procedure in box 54 further outputs a product argon nitrogen content filter constant which is later used to regulate the amount of feedback prediction correction applied to the nitrogen content future response prediction scheme. Next, the derived values from boxes 52 and 54 are fed to box 56 where a future response prediction feedback correction is calculated for the product argon nitrogen content value. More specifically, the trajectory of the prediction values is "rotated" so that the curve defined by the predicted values is moved closer to the currently measured value.

The output from box 56 is a corrected future response prediction for the product argon nitrogen content (box 58). That output, in a transformed scale, is used by the control scheme to alter the independent variables so as to achieve nitrogen control.

Figure 3A:
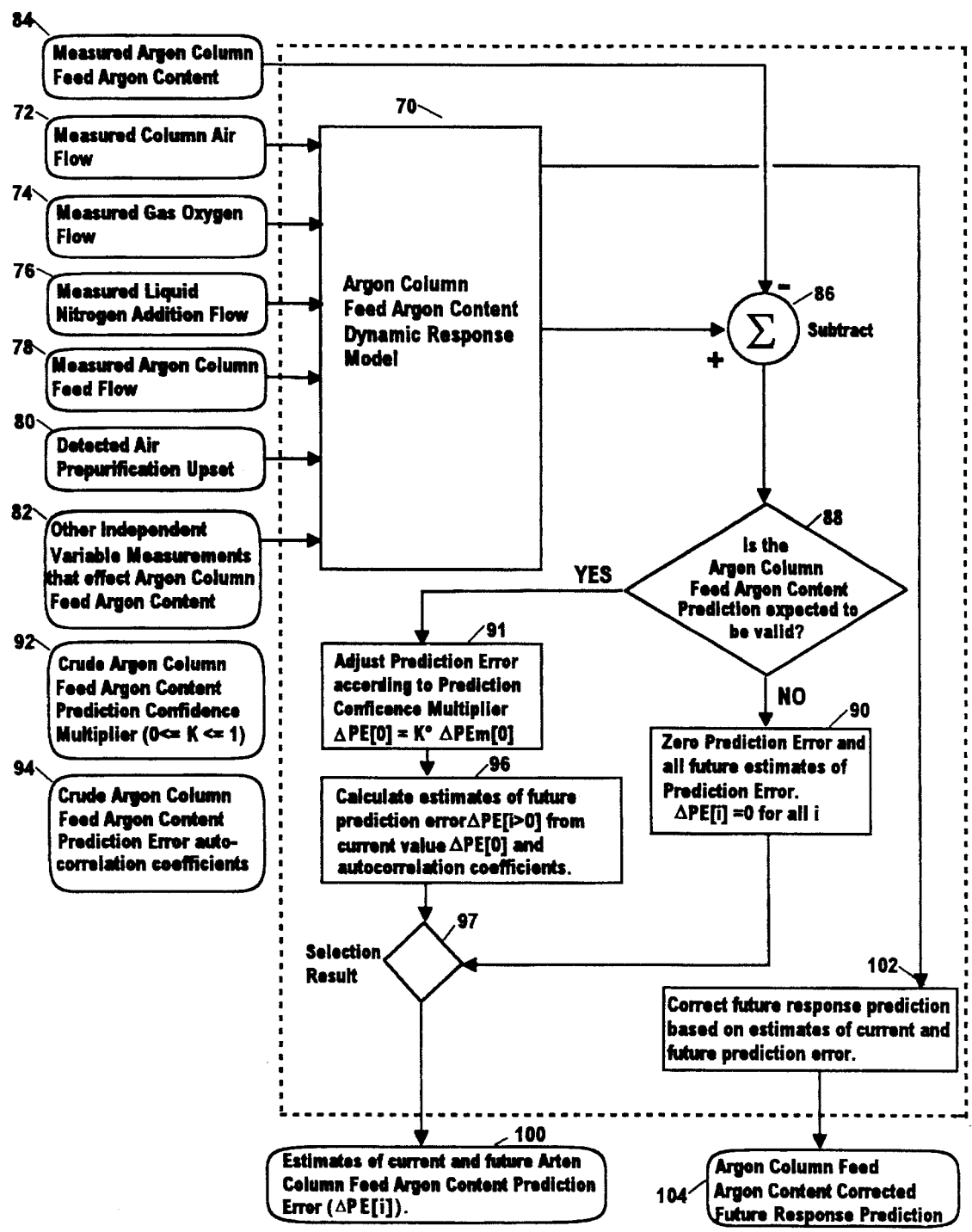
FIG. 3A is a high level flow diagram illustrating the process followed by the invention to enable product argon nitrogen content control value selection.

The process by which the argon column feed argon content prediction errors are estimated (box 50) is described below in FIG. 3A. A dynamic response model (box 70) forms a principal element of the prediction error estimator and may be configured to employ any of a plurality of measured values that affect argon output from low pressure column 24. Those measured values comprise: measured column airflow (box 72); measured gas oxygen flow, (box 74); measured liquid nitrogen addition flow (box 76); measured argon column feed flow (box 78); detected air prepurification upset (box 80); and other independent variable measurements (box 82) that affect the argon column feed argon content.

The dynamic response model includes one or more values from each of the aforesaid measured inputs (i.e. boxes 72, 74, 76, 78 and 80) to enable both a predicted current argon column feed argon content and predicted future argon column feed argon content values to be outputted. The future values are predicted over a specified future time window.

While various dynamic response models may be applied, a preferred one is a linear time-series model which is of the form:

$$y(k) = \sum_{i=1}^{I} \sum_{j=1}^{M} h(i,j) * \Delta u(i, k-j) + y_m$$

$$k = 0 \ldots N$$

$\Delta u(i,k-j)=0$ for all $(k-j)>0$ to obtain an estimate of the process response with no control action.
where:

| | |
|---|---|
| $k$ | sample interval for which an estimate is to be made ($k = 0$ provides current time). |
| $y(k)$ | predicted value of low pressure column purity measurement at sample time interval "$k$" in the future. |
| $\Delta u(i,k-j)$ | sample to sample change in independent variable "$i$" at sample interval "$k-j$". Negative "$k-j$" values indicate previous values, and positive "$k-j$" values indicate changes which may occur in the future. |
| $h(i,j)$ | Model step response coefficients, which are estimated or obtained from experimental testing of the process. |
| $N$ | number of sample periods for which prediction estimate is to be made. |
| $M$ | largest number of sample periods for which a change in any independent variable can still produce a transient effect on $y(k)$. |
| $I$ | number of independent variables. |
| $y_m$ | current measured value of the low pressure column feed argon content |

Values for h(i,j) are obtained by experimentation and, preferably, N=M=120 with a sample period of 2 minutes.

The predicted current value of argon column feed argon content determined from the dynamic response model (box 70) is compared to the current measured argon column feed argon content (box 84). That comparison occurs in summer 86 which produces a difference value that is the observed current prediction error, based upon the measured feed argon content.

The current argon column feed argon content prediction error can be abnormally large due to such operating conditions as column start up, prediction reset, or loss of measured independent value history. Under such conditions, it is determined (decision box 88) that the prediction is not expected to be valid, and both the current prediction error and future estimates of prediction error are zeroed (box 90). The validity determination arrived at in decision box 88 can be based, among other factors, on how long the model has been running.

If decision box 88 indicates that the argon column feed argon content predictions are expected to be valid, the current prediction error is multiplied by a constant (i.e., a prediction confidence multiplier) that represents the confidence (i.e., probability) that the observed prediction error is due to an unmodeled process disturbance and not due to modeling anomalies, such as a recent prediction reset (box 91). The prediction confidence multiplier (box 92) is provided as a value between zero and unity and normally has a value near unity. It is preferred that this constant be set to a value near unity, except during special process conditions such as prediction reset or column start-up, when it is assigned a value near zero and is slowly increased over one prediction window to its maximum value. Under other special process conditions (e.g. detection of certain column process upset conditions), the value of the multiplier is set to a function, which when multiplied by the prediction error will, with high probability, correlate to later changes in product argon nitrogen content. Thus while the prediction confidence multiplier is generally set to unity, the ability to revise the value of the multiplier renders the control method (and predicted responses) better able to cope with special process conditions.

Following calculation of the current prediction error, future values of prediction error can be estimated using coefficients obtained from a modeling of the autocorrelated behavior of the feed argon content prediction error. A set of autocorrelation coefficients defining an expected trend of the argon column feed argon content prediction error (box 94) is provided and an estimate is calculated (box 96) of the future prediction error, based upon the current prediction error value and the autocorrelation coefficients.

As a minimal estimate of future model accuracy, the feed argon content prediction can be assumed to be perfect for all future periods; however, it is preferred that the autocorrelated behavior of unmodeled disturbances that affect the feed argon content be taken into account. This can be accomplished by using an equation of the form:

$$\Delta PE(k) = \sum_{j=1}^{A} a(j) * \Delta PE(k-j) \qquad k = 1 \ldots N$$

where:

| | |
|---|---|
| $k$ | sample interval for which an estimate is to be made ($k = 0$ provides current time). |
| $\Delta PE(k)$ | estimated low pressure column measurement prediction error at sample time interval "$k$" in the future. $\Delta PE(0)$ is calculated based on the current observed prediction error. |
| $N$ | number of sample periods for which the prediction estimate is to be made. |
| $a(j)$ | prediction error autocorrelation modeling coefficient. |
| $A$ | number of autocorrelation coefficients to be included in the model. |

It is preferred that the value N=20, A=10 and the A(j) coefficients form a periodic regression of prediction error data.

As a result of the selection made in box 85, and the calculations in boxes 90, 98 and 96, estimates of current and future argon column feed argon content prediction errors are produced (box 100). These estimated prediction errors are used to correct and improve the previously calculated predicted future response of argon column feed argon content to arrive at an improved future response prediction (box 104) using the expression shown below:

$$y_a(k) = y(k) + \sum_{j=1}^{k+1} \Delta PE(k-j) \qquad k = 1 \ldots N$$

where

| | |
|---|---|
| $k$ | the sample interval for which the estimate is to be made |
| $y_a(k)$ | the corrected predicted value of the low pressure column measurement (e.g. feed argon content) at sample time interval "$k$" in the future. |
| $y(k)$ | the response model predicted value of the low pressure column measurement (e.g., feed argon content at sample time interval "$k$" in the future. |
| $\Delta PE(k)$ | estimated low pressure column measurement prediction error at sample time interval "$k$" in the future $\Delta PE(0)$ is calculated based on the current observed prediction error. |
| $N$ | the number of sample periods for which the prediction correction is to be made. |

Figure 3B:
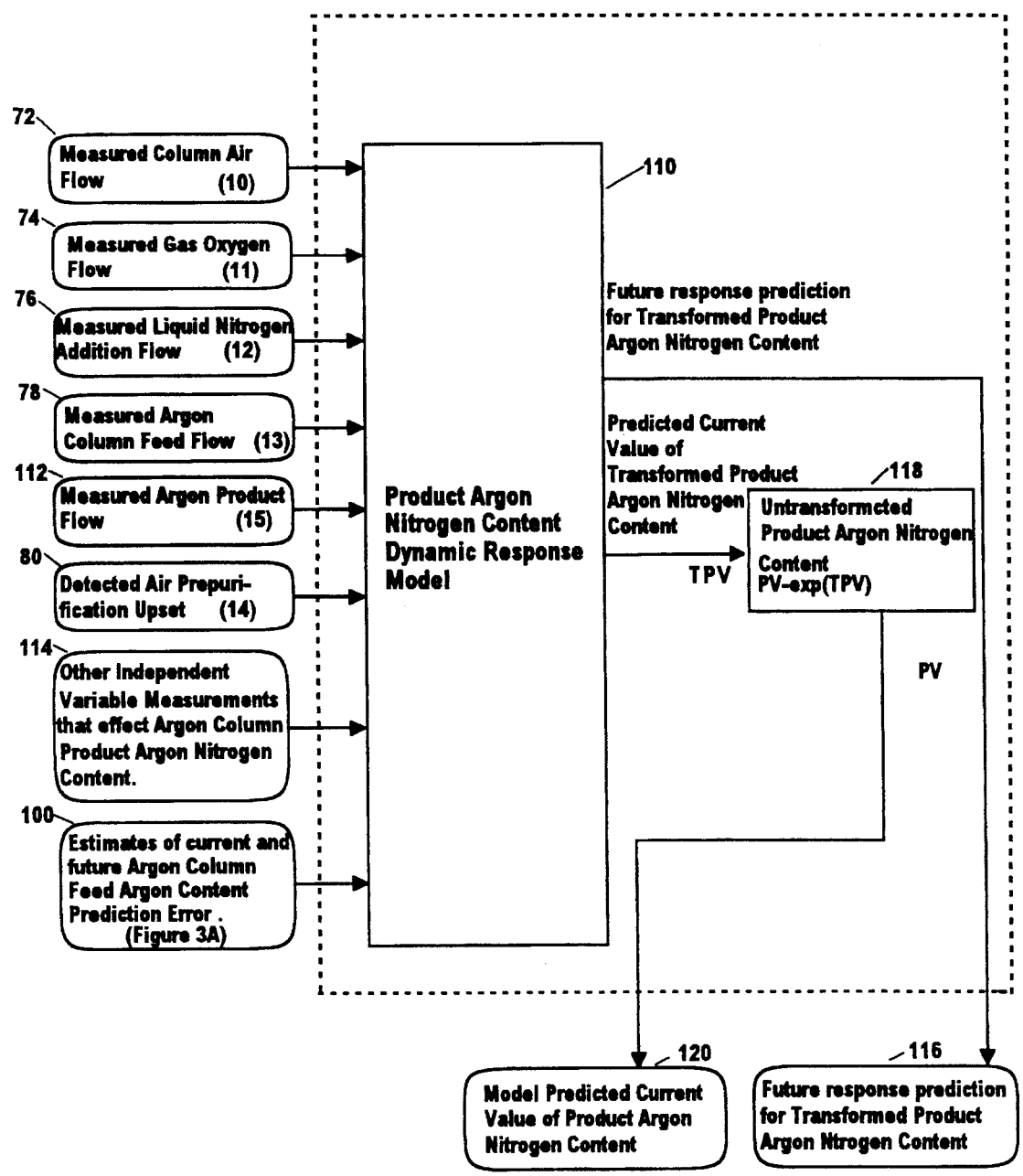
FIG. 3B is a high level flow diagram illustrating the process followed by the invention to derive product argon column feed argon content prediction error estimates.

Turning now to FIG. 3B, a dynamic response prediction is made regarding the nitrogen content of the output argon stream. A product argon nitrogen content dynamic response model (box 110) is employed and uses as one of its inputs the estimates of current and future argon column feed argon content prediction errors (box 100). The basis for this input to the dynamic response model is that an unmodeled process disturbance that affects low pressure column 24 (and the argon stream feed 30 to argon column 26) will, because of process relations, later affect product argon nitrogen content impurities. Thus, the dynamic response model is configured so that detected disturbances in the feed argon content cause adjustments in the predicted response of the product argon nitrogen content. This "feed-forward" of prediction error enables a more rapid and "intelligent" output of a future response prediction for product argon nitrogen content, thereby enabling the control system to respond with independent variable alterations to adjust for the predicted nitrogen values.

Inputs to the product argon nitrogen content dynamic response model are, in a number of instances, identical to those applied to the argon column dynamic response model (box 70). Thus, measured column airflow (box 72), measured gas oxygen flow (box 74), measured liquid nitrogen addition flow (box 76), measured argon column feed flow (box 78), and detected air prepurification upset (box 80) are all inputs to the dynamic response model (box 110). In addition, measured argon product flow (box 112) from low pressure column 24 is a further input, as are other independent measurements that affect argon nitrogen argon content (box 114). Lastly, as indicated above, the estimates of current and future argon column feed argon content prediction errors (as calculated above) are applied as inputs (box 100).

The product argon nitrogen content dynamic response model (box 110) consists of an estimated current value and a set of future values predicted over a specified future time window, as shown below:

$$x(k) = \left( \sum_{i=1}^{I} \sum_{j=1}^{M} h(i,j) * \Delta u(i,k-j) \right) + \left( \sum_{j=1}^{M} m(j) * \Delta PE(k-j) \right) + x_m$$

$$k = 0 \ldots N$$

$\Delta u(i,k-j)=0$ for all $(k-j) > 0$ to obtain an estimate of the process response with no control action.

where:

| | |
|---|---|
| $k$ | sample interval for which the estimate is to be made ($k = 0$ provides value for current time). |
| $x(k)$ | predicted value of the transformed product argon impurity measurement at sample time interval "$k$" in the future. |
| $\Delta u(i,k-j)$ | sample to sample change in independent variable "$i$" at sample interval "$k-j$". Negative "$k-j$" values indicate previous values, and positive "$k-j$" values indicate changes which may occur in the future. |
| $h(i,j)$ | Model step response coefficients, which are estimated or obtained from experimental testing of the process. |
| $m(j)$ | Model step response coefficient, estimated or obtained from experimental testing of the process, that relates a change in the low pressure column measurement to a later change in transformed argon impurity measurement. |
| $\Delta PE(k-j)$ | sample to sample change in low pressure column measurement prediction error at sample interval "$k-j$". |
| $N$ | number of sample periods for which the prediction estimate is to be made. |
| $M$ | largest number of sample periods for which a change in any independent variable can still produce a transient effect on $x(k)$. |
| $I$ | number of independent variables. |
| $x_m$ | estimate of current value of transformed product argon impurity measures. |

It is preferred that $h(i,j)$ and $m(j)$ be obtained by experimentation, and $N=M$ and set to the previously indicated values ($N=M=120$).

The dynamic response model shown above is a linear logarithmic function, but evidences a non-linear scaling relationship between inputs and outputs, and the output $x(k)$ is non-linear when converted to engineering units Thus, the output from the dynamic response model is a product argon nitrogen content future response prediction (box 116) wherein the determined values thereof have been transformed to a linear proportionality so as to enable subsequent processing to employ linear mathematics. As will be noted below, the transformed product argon nitrogen content value predictions are used to adjust a filter function, the transformed values being readily usable without complex calculation requirements.

In summary, the product argon nitrogen content dynamic response model provides two transformed outputs, i.e., a set of future response predictions for product argon nitrogen content, and a predicted current value of product argon nitrogen content. The latter value is "untransformed" (boxes 118, 120) for use in the control value selection procedure shown in FIG. 3C (to be discussed below). The transformed future response prediction values (box 116) are used, as is, as they are later employed for control calculations in the transformed mode (as will be described with respect to FIG. 3D).

Figure 3C:
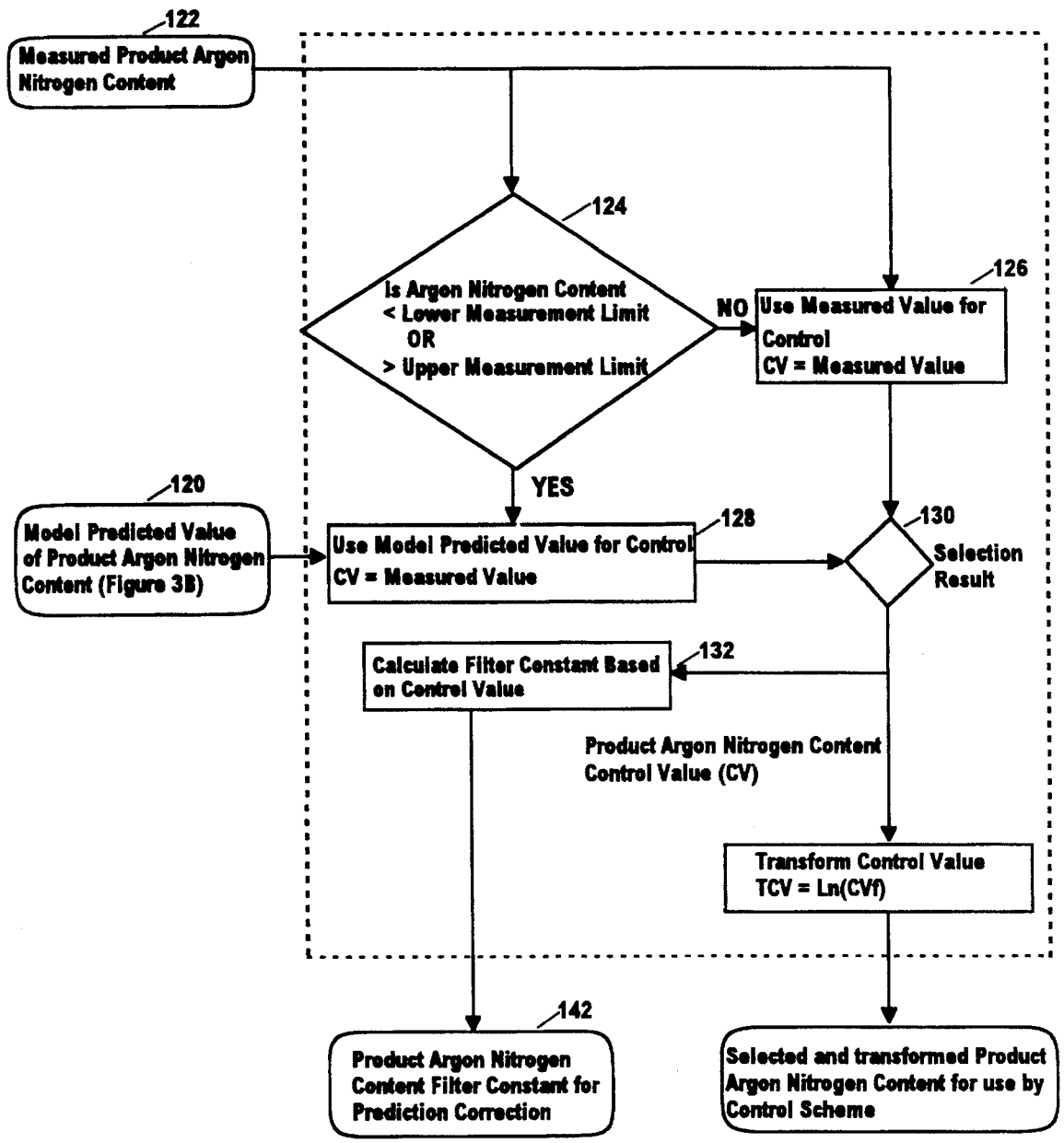
FIG. 3C is a high level flow diagram illustrating the process followed by the invention to derive product argon nitrogen content prediction.

Turning to FIG. 3C, the process employed by the invention to enable a control value selection for the product argon nitrogen content will be described. In brief, the procedure decides whether the measured product argon nitrogen content is outside of measurement limits and if yes, causes a model-predicted value to be employed for product argon nitrogen content. The reason for this action is that a measured product argon nitrogen content value that is outside of pre-established limits may cause a measurement "saturation" at either a high or low level, causing the system to use an inaccurate correction action that may further deteriorate the process. Under such conditions, a model-predicted value is employed rather than the measured value.

A filtering of the correction value is also performed, with filter constants adjusted so as to assure that at low values of nitrogen impurity in the argon stream, a lower filter constant value is employed, whereas at high values of nitrogen impurity in the argon stream, a higher filter constant value is employed. The alteration of the filter constant value in accordance with nitrogen impurity inclusion in the argon stream, results in a lesser filtering action at higher impurity levels and assures that noise present in the system is not emphasized at low level impurity values. At high values of nitrogen impurity, a larger filter constant value is employed as the noise signal has less effect. Thus, less selective filtering is achieved at higher impurity levels and more selective filtering at lower impurity levels, with noise effects being minimized at both impurity levels.

Characterization of the product argon nitrogen content sensitivity change through use of the above described value scaling transformation (logarithmic) modifies the effect of measurement noise on the control signal. Much of the signal noise is constant in absolute magnitude over the range of the measurement. Since a nonlinear value, transformation produces a disproportionate value depending upon the magnitude of the input, such a transformation will vary the magnitude of the noise contribution. For example, a logarithmic transformation:

$$y = Ln(Y)$$

where:

Y the input signal value.

y the transformed signal value.
provides a differential output:

$$\Delta y = \Delta Y / Y$$

where:

$\Delta Y$ an incremental change in input signal $\Delta y$ an incremental change in transformed value signal The magnitude of an incremental change in a logarithmic transformed value to an incremental change in input signal is inversely proportional to the magnitude of the input signal. Thus, constant magnitude signal noise will make greater contributions to noise in the transformed value signal at small values of the measurement signal.

A feature of this invention is to provide signal filtering with decreasing noise sensitivity at smaller signal values. This technique addresses potential prediction correction sensitivities to noise at small signal values, which commonly occur in the control of product argon nitrogen content. This is related to the fact that the argon nitrogen content measurement is generally taken by the difference of two separate analyses: oxygen plus nitrogen content in argon, and oxygen content in argon. The noise in each of these analyses contributes to the overall noise observed in the nitrogen content in the argon measurement.

The feedback prediction correction technique (described below) utilizes a filtering equation of the form:

$$y_t = y_{t-L} + k*(y_{in} - y_{t-L})$$

where:

$y_t$ = current filtered signal value $y_{t-L}$ = previous filtered signal value $y_{in}$ = input signal value k = filtering constant.

The magnitude of the variable filter constant k is adjusted by:

$$k = k_0 * (y_{in}/y_0)$$

where:

$k_0$ base filter constant $Y_0$ base signal value for filter constant selection.

In FIG. 3C a control value selection occurs. The process employs, as inputs, measured product argon nitrogen content (box 122) appearing at outflow 28 and the model-predicted value of current product argon nitrogen content (box 120), as derived in FIG. 3B. The measured product argon nitrogen content is first tested (decision box 124) to determine if it is either less than a lower measurement limit or exceeds an upper measurement limit. If no, the measured value (box 126) is selected for subsequent use. If yes, the model-predicted value is selected (box 128) for subsequent use based upon the assumption that it is better to employ the predicted value than an out-of-limits measured value which may result in an inaccurate correction action (box 130). The selected value is transformed according to the aforementioned non linear scaling (box 134), and provided for use in following calculations (box 140).

At this point, a filter constant is calculated (box 132) based on the product argon nitrogen content control value (which is, in essence, the nitrogen content measured in the product argon stream). As above indicated, the filter constant is derived in accordance with whether the nitrogen impurity is at a high level or a low level. The filter constant is provided as an output for later calculations (box 142).

Figure 3D:
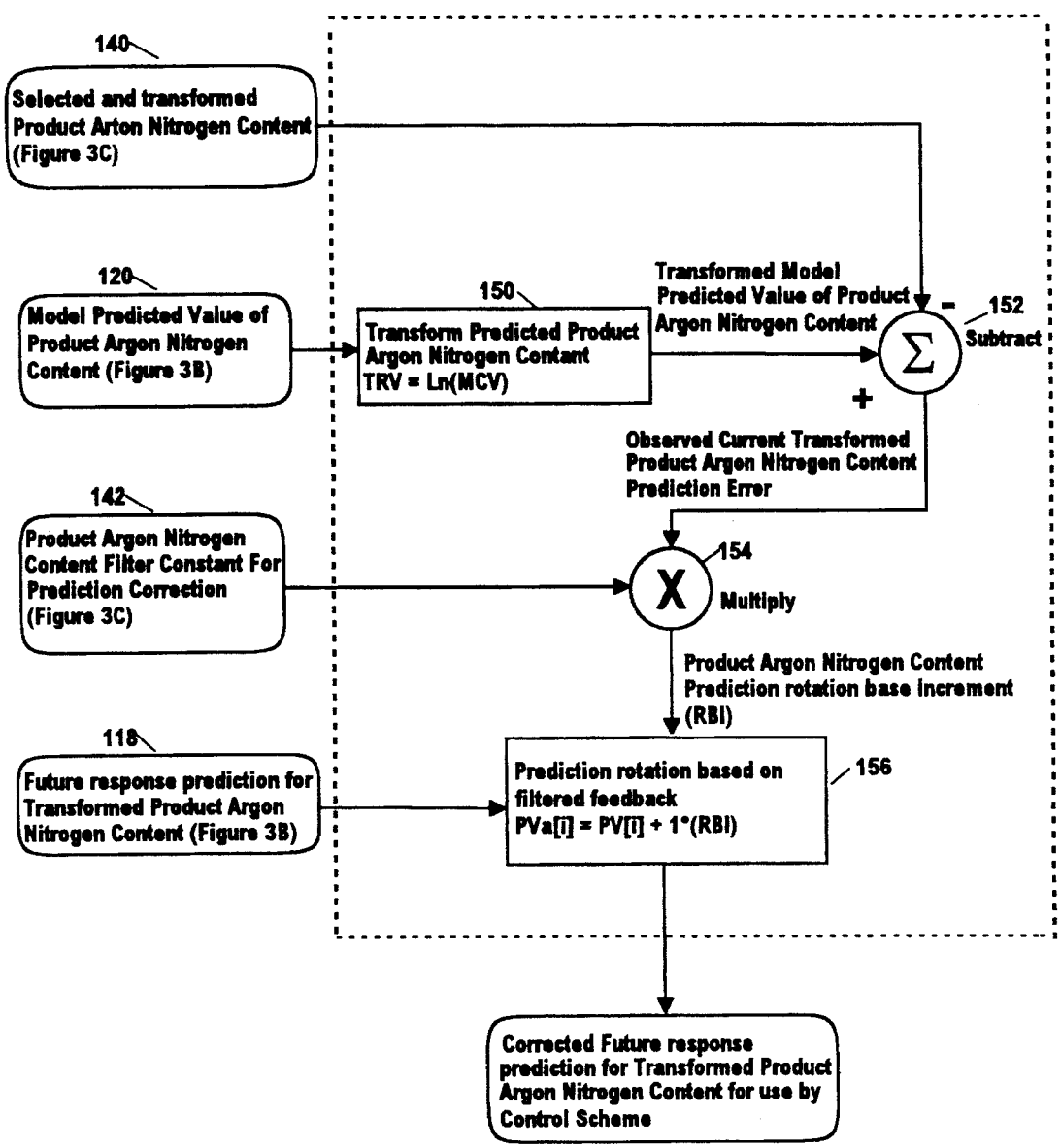
FIG. 3D is a high level flow diagram illustrating the process followed by the invention to arrive at a product argon nitrogen content prediction correction.

Turning to FIG. 3D, the procedure employed to determine a prediction correction based upon feedback measurement of product argon nitrogen content will be described. Inputs to the procedure have been previously derived, as shown in FIGS. 3B and 3C. More specifically, those inputs comprise the selected and transformed product argon nitrogen content (box 140); the model-predicted value of current product argon nitrogen content (box 120); the product argon nitrogen content filter constant for the prediction correction (box 142); and the future response prediction for the transformed product argon nitrogen content (box 118). Each of those inputs is employed to arrive at a prediction correction which, in essence, alters the previously estimated trajectory of the predicted nitrogen content in accordance with actual measurements, as modified by a filter constant. The current model-predicted nitrogen content, less the measured current nitrogen content (divided by the sample time increment), is calculated to determine a slope that is representative of the rate of change of prediction error. That slope is then multiplied by a filter constant to obtain a correction slope which indicates how much the predicted slope should be adjusted to bring it closer to the current measured slope.

The prediction correction is achieved by initially transforming the scale of model-predicted, product argon nitrogen content value (box 150). That value is input to a summer 152, to which is also applied the selected and transformed product argon, nitrogen content (box 140). If, as shown in FIG. 3C (boxes 124, 126 and 128), it is decided to employ the model-predicted value of product argon nitrogen content (due to the measured value being outside of measurement limits), then identical values are applied to summer 152 and the output therefrom is a null. By contrast, if it has been decided to use the measured value of product argon nitrogen content, then the output of summer 152 is an indication of the difference between the measured and predicted values of product argon nitrogen content.

Assuming the latter to be the case, the prediction error is fed to multiplier 154 in conjunction with the product argon nitrogen content filter constant (box 142). The output from multiplier 154 is a reduced value prediction error that is a result of the multiplication by the filter constant. Multiplier 154 outputs a product argon nitrogen content prediction increment to a prediction slope adjustment procedure (box 156). The "prediction" increment is applied to future response predictions for the product argon nitrogen content (box 118) to adjust the slope thereof closer to the current measured nitrogen content. The output from the procedure shown in box 156 is a corrected future response prediction for transformed product argon nitrogen content, for use by the control system in adjusting the independent variables to control the nitrogen content of the argon stream.

In summary, the above control procedure enables current values of a low pressure column measurement prediction error to be used to adjust dynamic response predictions of argon stream impurity measurements. Further, estimates of future values of low pressure column measurement prediction errors are used to adjust the dynamic response predictions of argon impurities. The low pressure column measurement future response predictions are corrected through the use of estimated future values of measurement prediction errors. A logarithmic or similar value transformation is employed in conjunction with an integrating model structure to model the nitrogen impurities in the product argon stream—thus assuring more compact and efficient processing. Finally, the invention preferentially selects and uses a model predicted value of product argon impurities in lieu of the measured value for execution of an impurity control strategy when the measured value is outside of the measurement range or is otherwise unavailable.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for controlling both an intermediate product and a downstream output product in a cryogenic air separation system, said intermediate product produced earlier than said output product, variations in a measure of said output product correlatable to earlier variations in a measure of said intermediate product, values of said intermediate product measure and output product measure depending upon independent variable phenomena, said method implemented by a software operated control computer and including the steps of:

a. providing measures of said intermediate product, said output product and said independent variable phenomena;
 b. predicting measures of said intermediate product based upon said independent variable phenomena and outputting predicted values therefor;
 c. determining a difference between a predicted value of said intermediate product and an actual measure of the intermediate product to arrive at a current prediction error value of said intermediate product;
 d. converting said current prediction error value of said intermediate product to a true current prediction error value of said intermediate product by employing an inputted confidence multiplier;
 e. estimating future values of said true current prediction error value of said intermediate product by correlation with previously calculated values;
 f. employing said true current and future prediction error values of the intermediate product estimated in steps d and e to modify a prediction value for a measure of said output product, prior to an effect upon said measure of said output product of said true current prediction error values of the intermediate product and future values of said true prediction error of said intermediate product; and
 g. employing said prediction value of the measure of said output product modified in step f, in a process regulation instrumentality.

2. The method as recited in claim 1 further comprising the step of:

h. correcting the prediction value for said output product, in response to a current measured output product value by:
  (1) determining a difference between a predicted measure value of said output product and said current measured output product value to obtain an output product prediction error, and
  (2) subjecting said output product prediction error to a variable filter function to remove noise from said output product prediction error, said variable filter function dependent upon a level of a measure of said output product value.

3. The method as recited in claim 2, wherein step h (2) further comprises:

(i) determining a difference between a predicted value and a measured value of the output product to arrive at a current prediction error;
 (ii) calculating a filter constant based, at least in part, upon said measured value of the output product;
 (iii) filtering said current prediction error for said output product by employing said filter constant calculated in (ii) to produce a substantially noise insensitive prediction error estimate; and
 (iv) correcting said prediction value of the measure of said output product using the filtered noise insensitive prediction error estimate for said output product.

4. The method as recited in claim 1 wherein said method is applied to a cryogenic air separation apparatus that includes a low pressure separation column and an argon column, said intermediate product being argon column feed argon content from said low pressure separation column and said output product being product argon from said argon column and including a nitrogen impurity.

5. The method as recited in claim 4 wherein step (b) provides a future response prediction of argon column feed argon content and a current predicted argon column feed argon content, and step (c) derives a difference between a measured argon column feed argon content and said current predicted argon column feed argon content to arrive at prediction error value of current argon column feed argon content.

6. The method as recited in claim 5, wherein step (f) employs argon column feed argon content prediction error values to determine both current and future response prediction values for product argon impurity content from said argon column.

7. The method as recited in claim 6 wherein said current and future response prediction values are of nitrogen impurity and are produced as values that are transformed to a linear scale.

8. The method as recited in claim 7 wherein a logarithmic function is employed to transform to a linear scale said current and future response prediction values of nitrogen impurity.

9. The method as recited in claim 6 wherein between step (f) and (g), the following step occurs:

selecting for output to a control scheme, a measured product argon nitrogen content value if said value is within set limits and if not, selecting for output, a model-predicted value of product argon nitrogen content so as to assure that an out-of-bounds product argon nitrogen content measure value is not used by said control scheme.

10. The method as recited in claim 6, wherein between steps (f) and (g) the method comprises the following additional steps of:

determining a filter function that is dependent upon a level of product argon nitrogen content;

applying said filter function to a product argon nitrogen content prediction error determined from a difference between measured product argon nitrogen content value and a model-predicted product argon nitrogen content value to determine a predicted value correction therefor.

11. The method as recited in claim 10 wherein said filter function provides a less selective filter action for higher values of product argon nitrogen content and provides a more selective filter action for lower values of product argon nitrogen content.

12. The method as recited in claim 1 wherein said cryogenic air separation system includes both a low pressure column and an argon column and wherein said measures of said intermediate product include at least one of: argon column feed argon content, argon column feed nitrogen content, low pressure column product oxygen purity, low pressure column waste oxygen content and low pressure column interstage purity.

13. The method as recited in claim 12 wherein said measure of output product is a measure of at least one of: argon product oxygen content and argon product total impurity content.

14. A method for controlling a downstream output product measure in a cryogenic air separation system, said output product measure being a product argon impurity, variations in a measure of said output product measure correlatable to earlier variations in a measure of an intermediate product, said method implemented by a software operated control computer and including the steps of:

(a) providing a measure of said product argon impurity;

(b) determining a filter constant that is dependent upon a level of product argon impurity; and (c) filtering said measure of said output product argon impurity employing said filter constant determined in step (b).

15. The method as recited in claim 14 wherein said filter constant determined in step b enables a less selective filter action for higher values of product argon impurity and a more selective filter action for lower values of product argon impurity.

16. The method as recited in claim 15 further comprising the step of:

(d) applying said measure of output product argon impurity, as filtered in step c, as an input to a process regulation instrumentality.

17. A method for controlling a cryogenic air separation system, said method employing a measure of product argon nitrogen content in a control action, said method comprising the steps of:

(a) determining a measure of product argon nitrogen content;

(b) determining a model-predicted value of product argon nitrogen content;

(c) comparing said measure of product argon nitrogen with preset limits; and (d) selecting for output to a control scheme, said measure of product argon nitrogen control if said measure is within said preset limits and if not, selecting for output, said model-predicted value of product argon nitrogen content so as to assure that an out-of-bounds product argon nitrogen content measure value is not used by said control scheme.

* * * * *